United States Patent [19]
Trudeau et al.

[11] Patent Number: 5,573,436
[45] Date of Patent: Nov. 12, 1996

[54] SEMI-SUBMERSIBLE OUTBOARD MOTOR COVER WITH AIR PASSAGE

[75] Inventors: Douglas A. Trudeau, Lake Villa, Ill.; Charles T. Rogan, Kenosha; Mark C. Noble, Pleaseant Prairie, both of Wis.

[73] Assignee: Outboard Marine Corporation, Waukegan, Ill.

[21] Appl. No.: 448,191

[22] Filed: May 23, 1995

[51] Int. Cl.$^6$ .................................................. B63H 20/32
[52] U.S. Cl. ............................................................ 440/77
[58] Field of Search .................... 440/77, 88; 123/155 P; 114/211

[56] References Cited

U.S. PATENT DOCUMENTS

| | | | |
|---|---|---|---|
| 4,518,363 | 5/1985 | Bland et al. | 440/77 |
| 4,571,193 | 2/1986 | Takada et al. . | |
| 4,723,927 | 2/1988 | Walsh et al. . | |
| 4,800,854 | 1/1989 | Boda et al. . | |
| 4,952,180 | 8/1990 | Watanabe et al. . | |
| 4,968,276 | 11/1990 | Hashimoto . | |
| 5,052,353 | 10/1991 | Dunham et al. | 440/77 |
| 5,052,960 | 10/1991 | Kato . | |
| 5,181,870 | 1/1993 | Arai et al. | 440/77 |
| 5,181,871 | 1/1993 | Hiraoka et al. . | |
| 5,277,633 | 1/1994 | Kato et al. . | |
| 5,328,395 | 7/1994 | Oishi . | |
| 5,340,343 | 8/1994 | Kawamukai et al. . | |

*Primary Examiner*—Sherman Basinger
*Attorney, Agent, or Firm*—Greer, Burns & Crain, Ltd.

[57] ABSTRACT

An improved air inlet cover for use with outboard motors is disclosed. A particular embodiment of the cover is formed by a generally hollow shell having an open side. An air passage is located opposite the open side at an upper portion of the shell. A baffle extends from an upper inner portion of the shell to an elevation below the air passage and is disposed generally opposite the air passage. An exit port is provided at the bottom of the chamber for discharging water collected therein, and a valve is provided within the exit port. When the exit port is submerged the valve is closed and provides a barrier to water entry. Preferably, the cover is located at an upper forward portion of the outboard motor cowl and both the air passage and air inlet are high up on the upper forward portion.

9 Claims, 2 Drawing Sheets

SEMI-SUBMERSIBLE OUTBOARD MOTOR COVER WITH AIR PASSAGE

The present invention relates generally to a cover for an outboard motor allowing for good air intake while providing a submersible port through which accumulated moisture may exit. More specifically, the present invention concerns a motor cowl having a front mounted portion which defines an air inlet and a chamber for collection of water. The chamber includes a port with a valve disposed therein to allow water to exit from the chamber. The valve also serves to restrict entry of water into the chamber through the port in the case of partial submersion.

BACKGROUND OF THE INVENTION

The environment that outboard motors operate in places special demands on the construction of the motors. Such motors require a sufficient amount of air inside the motor cowl to operate efficiently. One or more paths must therefore be provided for entry of air into the motor.

Unfortunately, such air paths also provide a potential entry point for water which has a detrimental effect on the operation and longevity of the engine. Operation may be adversely affected since water entered into the engine combustion system through an air path can cause the engine to lose power, sputter and stall. The life of the engine may be compromised since water, particularly salt water, drawn into the motor can cause corrosion of the motor over time.

Over the years, many techniques have been employed to address these particular problems. As an example, the basic configuration of outboard motors recognizes these difficulties. Typically, designs for all outboard motor place the engine in a power head formed by a casing referred to as a cowl. The cowl and encased engine are mounted to a watercraft so as to be held above water level. A separate casing attached to the cowl extends below the power head into the water and includes a drive shaft and propeller operatively connected to the engine within the power head. The cowl generally includes one or more inlets through which air enters for use by the engine.

The cowl, motor and air inlets are generally designed to be kept above water level to prevent the entry of water into the air inlets. However, even in that case, operation of the watercraft often results in waves and splashes of water to impinge upon the cowl and associated air inlets.

The splashing of water into cowl air passages is especially prevalent in outboard motors having rearward opening air passages, e.g., passages facing away from the watercraft. Sudden slowing of the watercraft in a body of water often results in a wave of water directed at the rear portion of the motor. This wave, commonly referred to as splash back, may direct water into the air passage.

Similarly, sudden acceleration or turning of a watercraft tends to force the rear portion of the water craft downward. In this situation the outboard motor, typically mounted to the rear of the craft, is lowered in an angled fashion toward the water level. Thus, the rearward portion of the cowl is brought in close proximity to, or even partially submerged below, the water level.

Forward facing portions of the cowl are less likely to become submerged, but may also be subjected to water splashing. Operation of the watercraft in a forward direction may induce spray and splashes which could enter into a forward facing air passage. Thus, while forward facing air passages reduce some risk of water entry, protection of the air passage is sill necessary.

Among the ways to protect both forward facing and rearward facing passages are use of a labyrinth or a baffle which serves to separate the air from water entering through an air passage. Examples of the labyrinth, formed by opposing partition plates, and baffle arrangements are provided in U.S. Pat. Nos. 5,181,870 (Arai et al) and 4,952,180 (Watanabe et al.), for instance.

Complex labyrinth arrangements may be effective in preventing water from entering through the air passage. However, such arrangements may overly restrict the amount of airflow into the engine thereby reducing horsepower output of the motor.

Simpler baffle arrangements have the advantage of better airflow. However, even though a baffle is successful in separating water from air, water may still enter into the cowl. If a path is not provided for exit of the water, accumulation may occur leading to corrosion and other problems. Addressing the accumulation problem, drainage techniques have been proposed in the prior art. Examples of cowls including means for draining separated water are shown in U.S. Pat. Nos. 5,328,395 (Oishi), 5,181,871 (Hiraoka et al.), and 4,723,927 (Walsh et al.).

Typically, as demonstrated in those patents, drainage is provided at a level below the air inlet on the outer portion of the cowl. After water is separated from air taken in through an inlet, the force of gravity is relied upon to drain the water through an appropriate exit. Of course, lower mounted openings in an outboard motor present greater opportunity for water entry because of spatial proximity to a water line. Extreme sloping may be used to prevent much splash entry through a drain opening, but in the case of partial submersion of the motor, water may enter through the drain passage.

In sum, there is a need for an improved cover for an outboard motor which simultaneously permits good airflow, separates air from water entering through an air passage, provides an exit for accumulated separated water and prevents entry of water through the exit. It is therefore an object of the present invention to provide an improved cover for an outboard motor which simultaneously performs those functions.

It is another object of the present invention to provide an improved cover having a generally hollow shell with an air passage, a diverter which diverts water entering the air passage into a collection chamber, and a discharge which discharges diverted water from the collection chamber.

Yet another object of the present invention is to provide an improved cover having an air passage at an upper portion of a hollow shell, a diverter which diverts water entering the air passage into a collection chamber, and a discharge which discharges diverted water from the collection chamber.

Still another object of the present invention is to provide an improved cover for an outboard motor which separates, diverts and discharges water entering an air passage and may be mounted to an existing outboard motor cowl.

A further object of the present invention is to provide an improved cover for an outboard motor which separates, diverts and discharges water entering an air passage through an exit and which prevents entry of water through the exit thereby allowing the motor to operate in a semi-submerged state.

SUMMARY OF THE INVENTION

The present invention concerns an improved cover for an outboard motor. A hollow shell is provided which is integrally formed with the cover or attached to it, and preferably made of impermeable rigid material. The shell may be open on one side to facilitate mounting to an existing motor cowl cover, but at a minimum should have an opening corresponding to an air inlet of the cover or cowl. An air passage in the shell allows air to be directed into the engine. Water entering the air passage is separated from the air by a diverter or baffle which is disposed in the shell. Diverted water is collected within a chamber formed by the shell when attached to a motor. A lower portion of the chamber includes a discharge, preferably in the form of an exit port and check valve, which discharges collected water from the chamber while preventing entry of water into the chamber should the discharge port become submerged.

The cover may be retrofitted to existing motor cowls or alternatively may be formed integrally in the manufacture of a new motor cowl. Preferably, the air passage is placed upon an uppermost portion of the shell and the cover is mounted to the forward portion of the motor, since this is the least likely portion of the motor to become submerged. Conventional fasteners, such as bolts, may be used with a seal to mount the cover to an existing outboard motor cowl.

BRIEF DESCRIPTION OF THE DRAWINGS

Other features, objects and advantages of the present invention will be readily apparent to those skilled in the art through reference to the detailed description and drawings, of which.

DETAILED DESCRIPTION OF THE INVENTION

Broadly stated, the present invention concerns an improved motor cover which separates water from air entering through an air passage, stores accumulated water, discharges the same through an exit port and prevents entry of water through the exit port. A specific embodiment of the present invention will now be discussed with reference to FIGS. 1–3.

Figure 1:
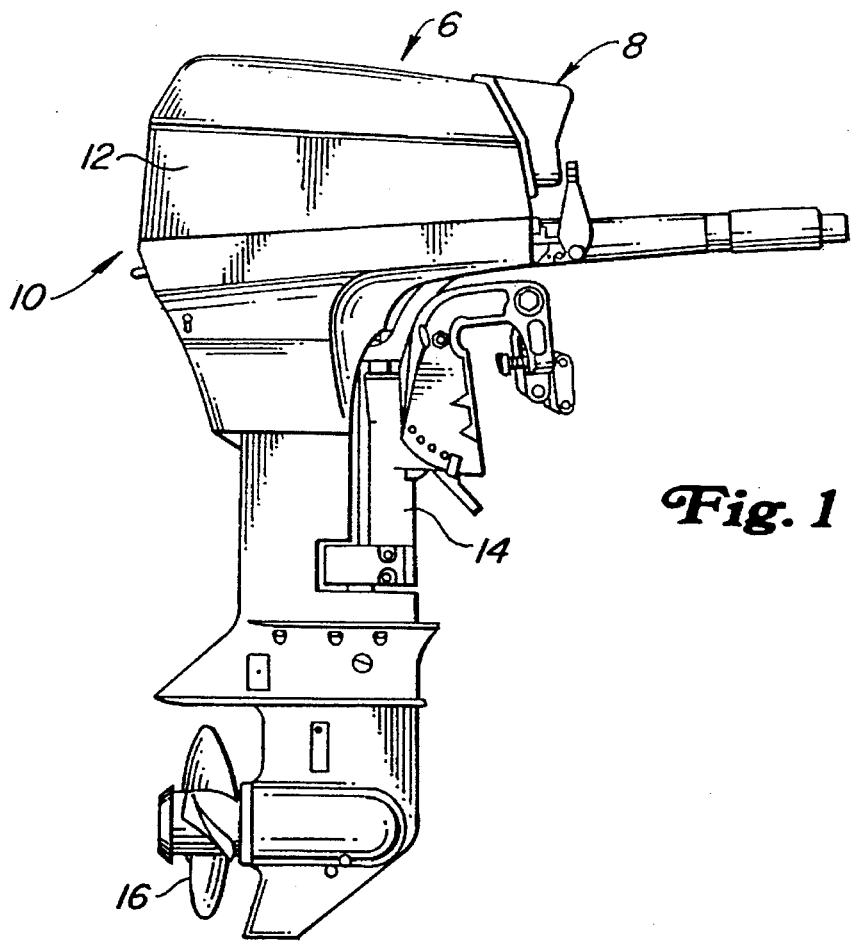
FIG. 1 is a side view showing an outboard motor having a cover mounted thereon in accordance with an embodiment of the present invention.

Referring now to FIG. 1, an outboard motor 6 is shown with a cover 8 formed according to the present invention. The motor 6, which may be any conventional or yet to be designed motor, includes a power head 10 protected by a cowl 12 housing an engine therein (not shown) and a shaft housing 14 below the power head. The shaft housing 14 contains a drive shaft operatively connected to the engine and a propeller 16. When the entire motor 6 is connected to a watercraft in a conventional manner rotation of the propeller 16 will propel the watercraft through a body of water in which it is floated. Similarly, turning of the motor 6 will cause the watercraft to turn when the propeller 16 is spinning. Propulsion of the watercraft in this manner may cause portions of the power head 10 to become submerged. Additionally, the entire motor 6 may be subjected to water caused by splashing of the motor 6 and associated watercraft.

Figure 2:
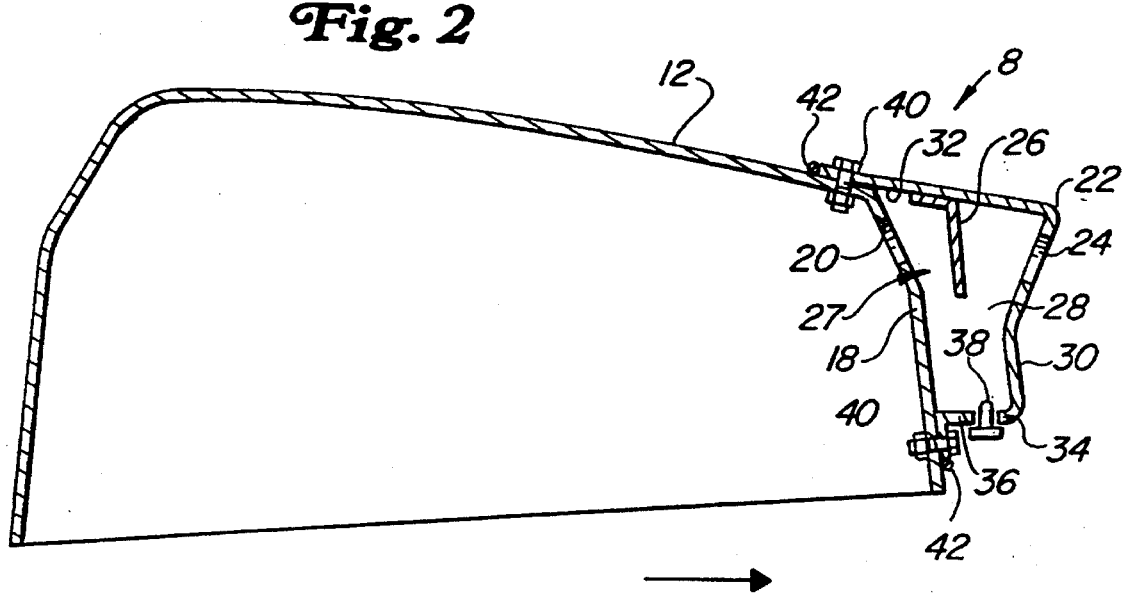
FIG. 2 is a cross sectional side view of a cover in accordance with an embodiment of the present invention.

Addressing this concern, the motor cover 8 in accordance with the present invention is preferably mounted to an upper forward portion 18 of the motor cowl 12, as is best shown in FIG. 2. This portion of the cowl is the least likely portion to become submerged during operation of a watercraft using a typical outboard motor installation. For the same reason, an air inlet 20 provided through the cowl for passage of air to engine (not shown) is also located high upon the cowl 12.

Many existing outboard motors have rearward facing air inlets in the cowl. In such a case, the cover 8 in accordance with the present invention could be mounted to the rear of the cowl. However, to take full advantage of the benefits of the present invention, a rearward facing air inlet could be sealed by conventional means and a new air inlet would be drilled or cut on a forward portion of the cowl to accommodate a cover 8 in accordance with the present invention. Such a new inlet should be as high as possible on the exiting cowl as an additional safeguard against submersion.

Still referring to FIG. 2, the cover 8 will now be described in more detail. The cover 8 should be formed of a rigid and impermeable material, an example of which is fiberglass. A generally hollow shell 22 includes an air passage 24 through which air may be drawn in by a functioning engine (not shown) within cowl 12.

Water entering the air passage 24, along with air, will impinge upon a deflector or baffle 26. Baffle 26 preferably extends below the air passage 24 and the air inlet 20. This arrangement insures that water entering the air passage 24, even at a downward angle, will deflect on the baffle 26 and be collected in a chamber 28 formed between a forward wall 30 of the cover 8 and the front upper portion 18 of the cowl 12. This front upper portion 18 preferably forms part of the chamber 28 since the cover 8 has a generally open end in the illustrated embodiment which encloses the front upper portion 18 of the cowl. Alternatively, the cover 8 may also have a small portion adjacent the portion 18, but would require more material and probably increased cost. The width of the baffle preferably exceeds that of at least the air passage 24 to insure that no direct path is provided for water to enter the air inlet 20. An upper inner surface 32 provides a suitable location for mounting the baffle 26 through any conventional technique. Of course, the baffle 26 may be mounted in any fashion which places it in front of the air passage 24. Alternatively, the baffle may be formed as an integral part of the upper inner surface 32 or another inner surface.

Gravitational force will draw water separated when impinged upon the baffle 26 downward into the chamber 28, where the water will collect. Even vapor water within the airflow entering air passage 24 will impinge upon the baffle 26, condense, and run down the baffle 26 into the chamber 28. Through this mechanism, water contained in the air flow entering the air passage 24 will be collected in the chamber.

The discharge of collected water within the chamber 28 is accomplished through an exit port 34 formed in a lower portion 36 of the cover 8. A valve 38 mounted within the exit port 34 is operable to open when the pressure arising from a predetermined volume of collected water exerts sufficient force upon the valve 38. Any valve suitable for this purpose may be used. A specific suitable valve is a check valve available from Outboard Marine Corporation, OMC part No. 983237.

Importantly, the valve 38 will remain closed if the exit port 34 becomes submerged because of the force of the water outside of the cover will exceed that of the water inside of the cover. The exit port 34 is lower than the air passage 24. Thus, as motor 6 and associated cover 8 become gradually submerged in a body of water, the exit port 34 provides an earlier entrance path for water. In such a case, pressure exerted by the body of water upon valve 38 will keep the valve 38 closed and prevent entry of water through the exit port 34. As a result, motor 6 may continue to operate when the cowl 12 and associated cover 8 are partially submerged within a body of water.

Under full submersion, a short period of operation will also be possible. When the cover 8 becomes fully submerged, water will begin to enter through air passage 24. Water initially entering the passage 24 due to submersion will first collect in chamber 28, providing a small window of time before water reaches the level of the air inlet 20. If the cover 8 is returned to the atmosphere near that time, collected water will drain through exit port 34 as the valve 38 opens and the engine (not shown) may continue to operate. Advantageously, a watercraft using an outboard motor 6 may therefore execute maneuvers or operate in external conditions which cause brief periods of complete submersion and long periods of semi-submersion.

The mounting of the cover 8 to the cowl 12 may be accomplished through any suitable fasteners, such as bolts 40. A washer, gasket or other sealing means should be used in conjunction with bolts 40 to preferably provide a watertight seal. Additionally, a seal 42 is provided around the open end 27 of cover 8 at all points of contact with upper portion 18 of cowl 12. Mounting the cover in this fashion to an existing cowl with predrilled, or newly drilled holes, generally will provide a water tight seal. Of course, the cowl 12 with associated cover 8 may be fabricated as an integral structure. Thus, the cover 8 in accordance with the present invention may be retrofitted to existing outboard motor cowls or may be incorporated into newly manufactured cowls, integrally or separately.

Figure 3:
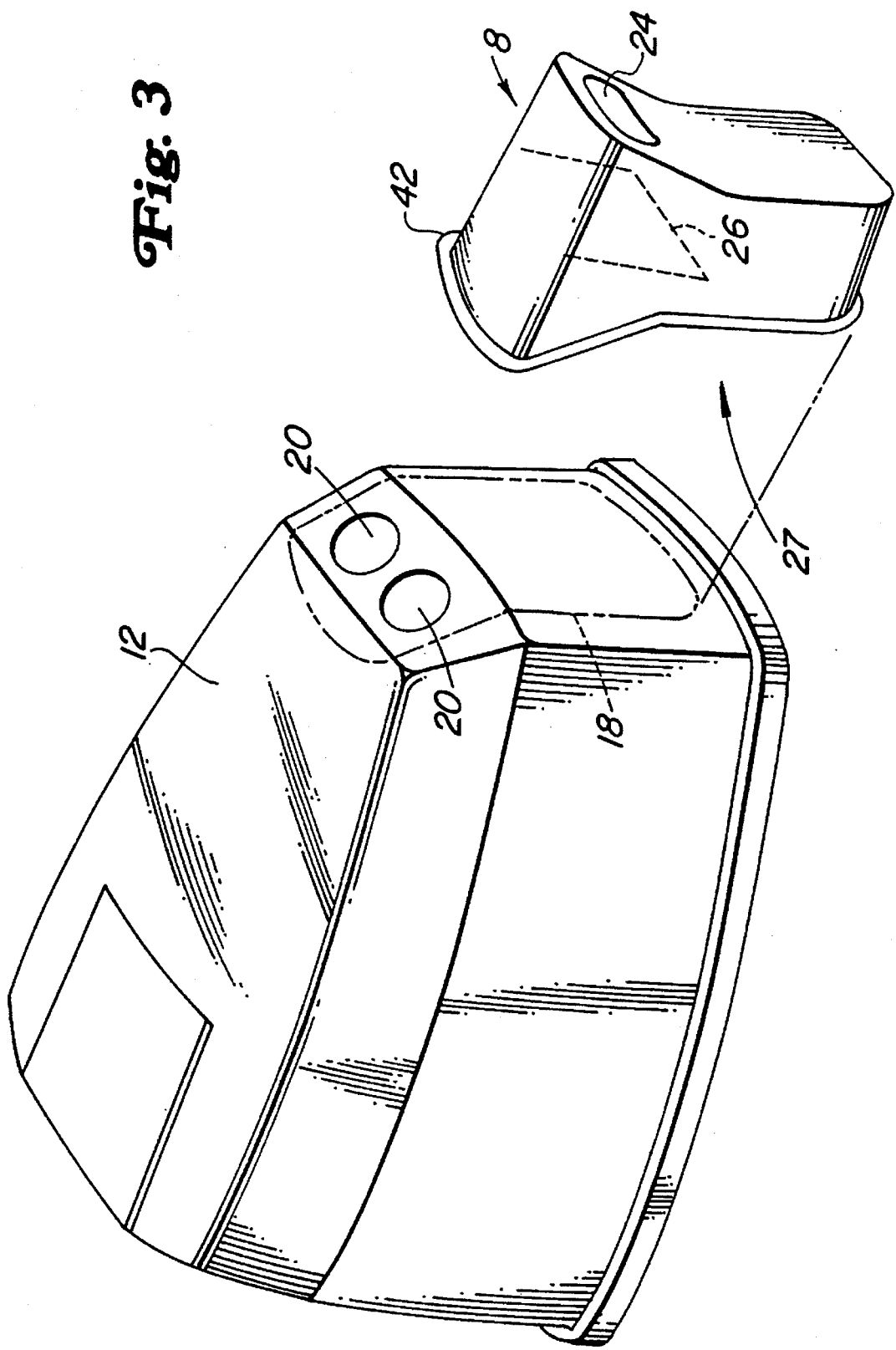
FIG. 3 is an exploded perspective view of an outboard motor cowl and a cover in accordance with an embodiment the present invention.

The shape and design of the cover 8 may be modified to conform with the particular cowl 112 for which it is used, as is illustrated in FIG. 3. However, the shape of the open end 27 must be such that the fit of open end 37 of cover to the upper front portion 18 of cowl is snug so that seal 42 effectively prevents water entry. The outer portion of the cover 8 may also be modified to conform with a desired aesthetic scheme.

The airflow characteristics may be changed by modifying the shape and number of both the air inlet 20 and the air passage 24. As an example, the embodiment illustrated in FIG. 3 includes two round air inlets 20 and an oblong air passage 24. In the embodiment of FIG. 3, the baffle 26 within the cover 8 should be at least as wide as air passage 24 and should extend below both the air inlets 20 and air passage 34. Air passages 24 might also be placed in side surfaces, or even the top surface of the cover 8. Many other modifications falling within the scope of the present invention will be apparent to those skilled in the art. The scope of the present invention is not limited to the particular embodiments illustrated above, but includes the following claims and legal equivalents thereof.

What is claimed is:

1. A motor cover for an outboard motor having an upper cowl which covers the power head of the motor, the cowl having at least one forward facing air inlet, said cover comprising:

a generally hollow shell mounted to the cowl and having an opening on one side thereof in communication with the air inlet of the cowl of the outboard motor;

an air passage penetrating another side of said hollow shell;

water diversion means within said hollow shell for diverting water entering said air passage into a collection chamber formed when said hollow shell is mounted to the cowl of the outboard motor; and water discharge means in a lower part of said hollow shell for discharging water collected within said collection chamber.

2. A motor cover according to claim 1 wherein said water discharge means prevents entry of water into said collection chamber when submerged in a body of water.

3. A motor cover according to claim 2 wherein said water discharge means comprises an exit port with a check valve.

4. A motor cover according to claim 3 further comprising:

mounting means disposed at said one side for mounting said hollow shell to said upper cowl; and a seal disposed around said one side.

5. A motor cover according to claim 2 wherein said hollow shell is formed integrally with the cowl of the outboard motor.

6. A motor cover for an outboard motor having an upper cowl which covers the power head of the motor, the cowl having at least one forward facing air inlet, said cover comprising:

a generally hollow shell mounted to the cowl and having an opening on one side thereof in communication with the air inlet of the cowl of the outboard motor;

mounting means disposed at said one side for mounting said hollow shell to said upper cowl;

an air passage penetrating another side of said hollow shell;

water diversion means within said hollow shell for diverting water entering said air passage into a collection chamber formed when said hollow shell is mounted to the cowl of the outboard motor; and water discharge means in a lower part of said hollow shell for discharging water collected within said collection chamber;

said mounting means mounts said hollow shell about said air inlet.

7. A motor cowl for an outboard motor comprising:

a main portion adapted to cover the top of the motor and having a first inlet for admitting air into the main portion;

a cover portion carried by said main portion, said cover portion being smaller that said main portion and comprising:

a hollow shell formed of impermeable material attached to said main portion and having an opening on one side thereof in communication with said first inlet of said main portion, said shell and main portion forming a chamber adapted to accept water;

an air passage located near the top of said shell and adapted to admit outside air into said chamber;

a baffle extending from an inner surface of said hollow shell, said baffle being disposed opposite said air passage and extending below said air passage so that water entering said second inlet will be deflected downwardly; and, a water exit port disposed at a bottom portion of said shell;

said hollow shell being mounted to said upper cowl about said air inlet so that said baffle is disposed between said air inlet and said air passage and said baffle extends below said air inlet.

8. A motor cowl according to claim 7 further comprising:

a submersible valve disposed within said water exit port, said valve being adapted to open to allow water accumulated within said chamber to exit through said water exit port and close when submerged within a body of water to prevent entry of water into said chamber through said water exit port.

9. A motor cowl according to claim 8 further comprising:

mounting means disposed at said one side for mounting said hollow shell to said upper cowl; and a seal disposed around said one side.

* * * * *